Figure 1:
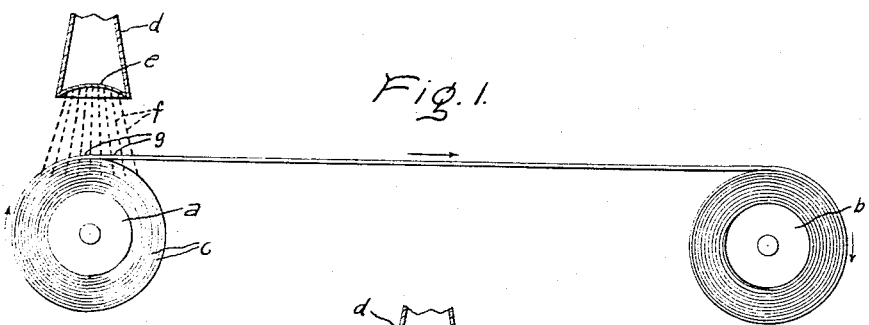

July 11, 1967

E. J. LAWTON 3,330,748

METHOD AND APPARATUS FOR IRRADIATING
ORGANIC POLYMERS WITH ELECTRONS

Filed Jan. 11, 1955

2 Sheets-Sheet 1

Inventor:
Elliott J. Lawton,
by Paul A. Frank
His Attorney.

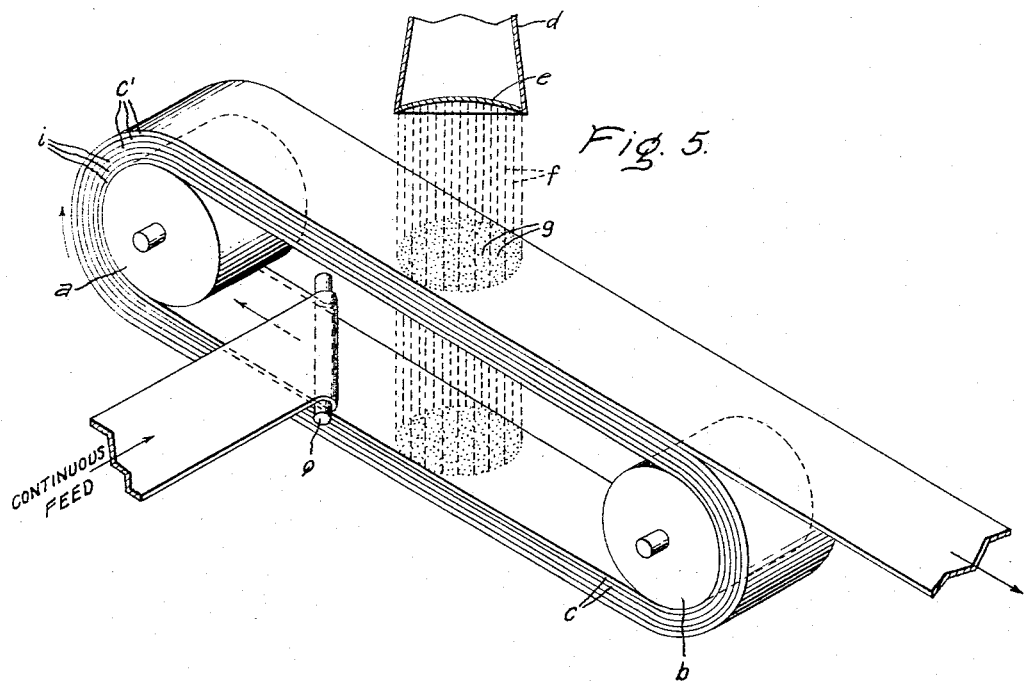
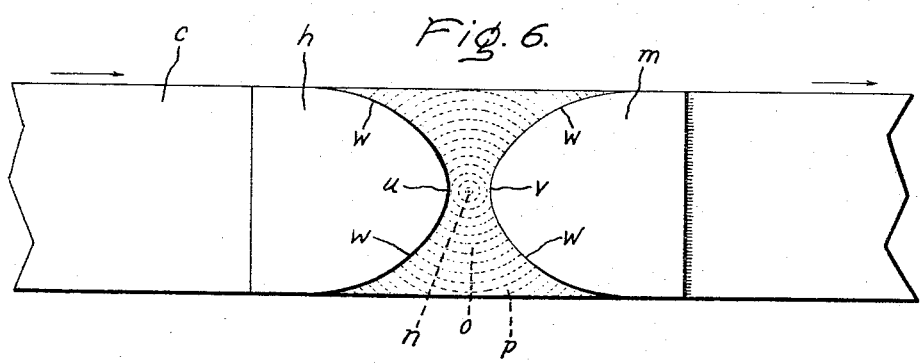

3,330,748
METHOD AND APPARATUS FOR IRRADIATING ORGANIC POLYMERS WITH ELECTRONS
Elliott J. Lawton, Schenectady, N.Y., assignor to General Electric Company, a corporation of New York
Filed Jan. 11, 1955, Ser. No. 481,152
17 Claims. (Cl. 204—158)

This invention is concerned with a process for irradiating an organic polymer with high energy radiation to improve the properties of the polymer. More particularly, the invention is concerned with a process for irradiating, preferably on a continuous basic, an organic polymer such as polyethylene, whose properties are subject to beneficial mutation by said irradiation whereby more efficient utilization and conservation of the total penetrating power of the high energy radiation is obtained in accumulating the desired irradiation dose in the polymer, which process comprises passing a plurality, e.g., at least two or more, superposed layers or plies of the polymer simultaneously through the radiation beam until the desired dose level is obtained in each section of the polymer.

In the copending application of Elliott J. Lawton and Arthur M. Bueche, Ser. No. 324,552, (now abandoned), filed Dec. 6, 1952, and assigned to the assignee of the present invention, there is disclosed and claimed a process for irradiating polyethylene with high energy electrons to improve the properties of the latter. By means of this irradiation, it is possible to render the polyethylene substantially infusible and insoluble at temperatures well above the temperatures at which the unirradiated material melts or softens. Such irradiation also improves other properties of the latter as, for instance, it reduces the solubility of the polymer in various solvents in which the unirradiated material is ordinarily soluble as well as improving the stress cracking characteristics of the polyethylene in the presence of certain chemicals such as toluene, lubricating oils, etc.

According to the aforesaid Lawton and Beuche application, irradiation of the polyethylene is accomplished by passing a single ply of the polyethylene, for example, in sheet or tape form, continuously under and through the beam of high energy electrons at a velocity selected to give the desired irradiation dose. After a single pass through the electron beam, the irradiated material is wound up or suitably removed without further treatment. This method of irradiating with high energy electrons is extremely expensive because it does not make for efficient utilization of the electron energy. The electrons used in this process have energies of many hundreds or thousands of kilovolts which are required for the purpose and which are difficult and costly to generate. Thus, following the disclosures and teachings in the above-mentioned Lawton and Bueche application, much of the irradiation emanating from the electron beam would penetrate through the plastic film being irradiated and would be lost in the air spaces beneath the film. Also, because of the variation in intensity from one area of the electron beam to another, much of the energy of the beam would be wasted in the over-irradiation of the center of the object while the minimum edge dose is being acquired. One of the consequences of this type of irradiation has been that the products obtained thereby have been too expensive for general application. This practical and economic fact has severely limited and restricted the applications on a commercial basis of irradiation and of irradiated products such as the organic polymers.

I have now discovered a means whereby the cost of irradiating organic polymers can be greatly reduced and the fields of application of both irradiation and of irradiated products greatly extended. In accordance with my invention, I am able to avoid the loss of valuable high energy radiation, e.g., high energy electrons, caused by penetration of the radiation through the irradiated object. It is one consequence of my invention that the product quality will be improved because material processed in accordance with our invention will receive more uniform dosage despite variable radiation fields than has heretofore been economically possible.

In accomplishing the above desirable objectives, I effect irradiation of the organic polymer (which may be in the form of flat stock such as sheet material, tape, lay-flat tubing, etc.) whose properties are desirably affected by irradiation with high energy radiation by causing a given section of an organic polymeric material to repeatedly pass through the beam of high energy radiation in various positions and under conditions of varying beam intensities. Thus, in each successive pass through the beam the given section of the material is subjected to a different intensity of irradiation than in the immediately previous pass through the same beam, to the point where the accumulated radiation dose resulting from all the passes yields the dose level desired in said section. It is evident that each section of polymeric material will pass through the same beam more than once in order to accomplish the above results. Optimum results are obtained if during essentially the entire irradiation a plurality of plies are in the path of the high energy radiation (hereinafter referred to as "radiation") so that the radiation passing through the ply closest to the energy source will be allowed to impinge on successive layers of the organic polymer underneath the upper layer up to a point where the lowest ply will absorb essentially all of the residual energy passing through the plies above it so that little, if any, of the radiation passes through the ply farthest from the beam. Subsequently, as a result of processing as herein described, the section of material in the lowest ply may either work its way up immediately so that it becomes the ply closest the energy source or may become a ply closer the energy source than it was initially in the first irradiation dose received. The converse of this is also intended to be included, namely, that section of material in the ply closest the energy source initially may become the ply farthest from the energy source or farther than it was initially. A third alternative includes irradiating the section in the center of the plurality of plies and allowing it to work its way through points at different distances from the beam than it was in its initial pass through the beam. This successive passage of a given section of polymeric material on every other section through the radiation beam is preferably discontinued when it has received the desired radiation dose. There are many variations of this handling technique whereby conservation of the radiation is accomplished and uniformity of irradiation is effected throughout each section of the polymer being irradiated. Such irradiation will be carried out in the manner designed to effect the desired degree of irradiation most economically and efficiently, consistent with uniform irradiation throughout the cross-sectional area of the impinging high energy radiation. Modifications of this method of irradiation will be described below.

The term "ply" or "plies" is intended to mean a layer or layers of flat stock material of organic polymers of essentially uniform thickness and includes flat sheets, tapes, films, flattened tubing, U-shaped tubing (wherein the sheet or film or tape is half curved to give a U-shaped body in which the straight members of the U are parallel in passing under the high energy radiation beam), etc.

The term "band" employed in the description of the present invention and in the appended claims is intended to mean a plurality of two or more plies in close alignment with each other in which the individual plies are superposed one upon the other and are preferably contiguous and in direct contact along essentially the entire area of each ply.

The term "organic polymer" is intended to include solid organic compositions capable of being utilized in flat stock form, and which are capable of being irradiated with various sources of high energies, for instance, high energy electrons, in order to modify the properties of the organic polymer in an advantageous and desirable manner. Among such polymers may be mentioned, for instance, polyethylene, chlorinated polyethylene, chlorosulfonated polyethylene, superpolyamide resins, various natural and synthetic rubbers including copolymers of butadiene and styrene, copolymers of butadiene and acrylonitrile, silicone rubbers, that is, organopolysiloxanes convertible to the cured, solid, elastic state by treatment with the high energy radiation, polyacrylonitrile materials, polyethylene terephthalate-type polymers (such as those sold under the name of "Mylar"), etc. Many of these polymers are described in the copending applications of Lawton and Bueche, Ser. Nos. 324,552; 324,554 (both now abandoned); and 324,555, filed Dec. 6, 1952 (now Patent 2,858,259), as well as in Lewis and Lawton application, Ser. No. 291,542, filed June 3, 1952 (now Patent 2,763,609), all of the applications being assigned to the assignee of the present invention. In the discussion which follows, rather than refer continuously to the term "organic polymer," reference will be made solely to polyethylene as the example of the organic polymer, it being understood that the discussion is also intended to apply to the other organic polymers subject to beneficial mutation by irradiation with high energy radiation.

The term "beam" as employed in the present specification and claims is intended to mean a stream of high energy radiation (such as high energy electrons supplied by a cathode ray generator which is used in the following description for illustrative and not limiting purposes) which can effect the desirable mutation of the organic polymer in the passage of the latter through the zone of radiation.

Various modifications of the above physical form of the organic polymer obviously can be employed without departing from the scope of the invention. Wherever a single ply is referred to, it could be replaced by several plies handled together as a laminate such as "lay-flat" tubing or either single film or lay-flat tubing folded upon itself once or several times. Processing several plies as one offers the advantage that the required lineal speeds for a given ultimate film thickness is proportionately reduced. Use of lay-flat tubing, or folded film, or folded lay-flat tubing offers the additional advantage that the material can be opened after irradiation to yield a film width two or more times the effective width of the high energy beam pattern. None of these changes affect the basic characteristics of the process provided that at least two or more passes are made under the beam from optimum and most economic utilization of the high energy radiation source.

The source of high energy radiation employed in carrying out my invention may also be varied widely. Thus, one can use as the source of high energy radiation a cathode ray generator having a circular, symmetrical pattern. One could alternatively employ other forms of radiation such as cathode ray generators having other beam patterns, X-ray generators, or radioactive material such as a cobalt 60 source of gamma radiation. In general, although one can use alpha, beta, gamma, or even neutron radiation, we prefer to employ high energy electron or cathode ray radiation.

The more available and presently more practical and economical source of high energy radiation is found in the high energy electrons generated by high voltage apparatus which is more particularly disclosed in U.S. Patent No. 2,144,518 of William F. Westendorp, issued Jan. 17, 1939, and assigned to the assignee of the present invention. In general, this apparatus comprises a resonant system having an open magnetic circuit inductance coil which is positioned within the tank and energized by a source of alternating voltage to generate the high voltage across its extremities. At the upper end of a sealed off evacuated tubular envelope is located a source of electrons which is maintained at the potential of the upper extremity of the inductance coil whereby a pulse of electrons is accelerated down the envelope once during each cycle of the energizing voltage when the upper extremity of the inductance coil is at a negative potential with respect to the lower end. Further details of the construction in operation of high voltage apparatus of this type may be found in the aforementioned patent and also in Electronics, volume 16, pages 128–133 (1944).

The aforesaid high voltage apparatus is more particularly described in the aforementioned Lawton and Bueche application, Serial No. 324,552 (now abandoned). The above apparatus is provided with an elongated metal tube which extends below a hermetically sealed tank. The lower portion of the tube is generally conical in cross section to permit an increased angular spread of the electron beam. The emergence of high energy electrons from the tube is facilitated by an end window which is preferably hermetically sealed to the tube. The end window should be thin enough to permit electrons of desired energy to pass therethrough but thick enough to withstand the force of atmospheric pressure. Stainless steel of about 0.002" thickness has been found satisfactory for use with electron energies of about 230,000 electron volts or greater. By forming the end window in arcuate shape, greater strength for resisting the force of atmospheric pressure may be obtained for a given window thickness. Desired focusing of the accelerator electrons may be secured by a magnetic field generating winding energized by a source of direct current through a variable resistor.

As pointed out previously, prior methods for irradiating organic polymers include no process for the efficient low cost irradiation of such polymers, particularly when they are in the form of sheets or film. Conventional practice has been to expose, for instance, sheet material or film, either by passing individual sections through the beam at a given rate or exposing them to the beam for a given period of time. When uniform irradiation has been desired, a small, thin section of film has been exposed with only a small segment of the beam being intercepted, and only a small fraction of the intercepted beam being absorbed in passing through the film. Such techniques have prevented a more efficient and more economical utilization of the irradiation of the aforesaid organic polymers. Since very complex and expensive equipment is required for the generation of cathode rays of even very limited total energy, improvements in the manner of irradiation can be obtained at a reasonable cost only if the entire output of a cathode ray generator can be very efficiently utilized in the irradiation of the organic polymer. This requires first that no appreciable fraction of the cathode ray beam fail to strike the films; second that no appreciable fraction of the cathode ray beam pass through the film without being completely absorbed; and third that all of the film being irradiated receive only the minimum degree of irradiation required to produce the particular improvement in properties desired with no parts of the film being wastefully over-irradiated. It has proved very difficult in practice to efficiently utilize the entire output of the cathode ray generator when irradiating film. The first cause of the difficulty is the penetrating characteristic of the cathode ray beam. Even an 800 kilovolt peak cathode ray beam will penetrate to a depth of about 120 mils in polyethylene, with much greater penetration occurring with higher peak kilovoltage beams. This means that when irradiating 5 mil film, for example, a total of 24 layers must be employed to completely absorb the beam energy. Furthermore, the intensity of irradiation varies markedly at each depth level as shown by the following tabulation for a typical 800 kilovolt peak cathode ray beam:

Table I

| Depth below polyethylene surface (mils): | Approximate relative intensity of irradiation |
|---|---|
| 0 | 1.000 |
| 20 | 1.153 |
| 40 | 0.952 |
| 60 | 0.698 |
| 80 | 0.445 |
| 100 | 0.220 |
| 120 | 0.065 |

Therefore, if the layers near the bottom are subjected to the required degree of irradiation, the layers near the top will be wastefully over-irradiated.

In order to eliminate the inefficiency due to the penetrating characteristics of the cathode ray beam, I expose the film in a sufficient number of plies or layers so that for optimum utilization, essentially all of the radiation is absorbed by the plied material under the beam, and none of the beam penetrates through the bottom ply, while simultaneously causing the film to move in such a manner that every section of the film passes under the beam once at each ply level before finally being removed as a fully irradiated product. FIG. 1 of the attached drawing, which illustrates one method for obtaining efficient utilization of the high energy beam, is a side view of an apparatus comprising two rolls $a$ and $b$ driven by suitable mechanical means revolving in the direction of the arrows. Polyethylene film is unwound from roll $a$ and wound on roll $b$. As the polyethylene begins to unwind from roll $a$, the high energy electrons $f$ issuing from the exit window $e$ of cathode ray generating tube $d$ impinge on the surface $g$ immediately under the cathode tube window. Each section of the film $c$ (after the first few layers have been unrolled) makes a pass under the film at each ply depth receiving radiation as the film is unwound. Thus, the outer periphery of the roll of tape is being continuously irradiated as the tape is being removed and unwound at a constant linear velocity. The beam is always being substantially completely absorbed in the plurality of layers throughout the penetration range of the beam. Layers of tape below the maximum pentration range, of course, will be receiving no irradiation at all. The irradiation intensity that a particular layer will be exposed to at a given instant of time as the roll revolves in the beam will depend on the position of the layer within the penetration range. As the roll is unwound and layers effectively work their way toward the outer surface $g$, they accumulate irradiation dose. Thus, by the time a given section of film reaches the surface, it will have received an accumulated dose equal to the sum of dosage received in making each revolution within the penetration range, that is, within the depth to which the high energy electrons penetrated. In this manner it is possible to accumulate a uniform irradiation dose throughout the length of the tape or film without any waste of the penetrating power of the beam. The first lead strip that is removed from the roll obviously will not have received the full accumulated irradiation dose. This can be overcome by building up the irradiation dose in the outer layer to equal that of the desired accumulated dose before starting to remove the tape from the roll. Alternatively, the irradiation dose can be accumulated as the tape, film or sheet material is being wound onto a roll by placing the cathode ray generator over roll $b$ instead of over roll $a$.

It is possible to calculate the accumulated irradiation dose by plotting the absorption curve of a high energy electron beam in terms of the total number of layers of sheet material. A typical absorption curve when using an 800 kv. beam (see Table I) will show a slight increase in the relative irradiation dose for the first few, for instance, for the first five, layers of said material and thereafter will begin to decrease rapidly as the number of layers increases through which the beam must penetrate. The maximum penetration of electrons into the material depends on the energy or velocity of the electrons and the density of the absorbing material. The total range is essentially proportional to the energy and inversely proportional to the density of the absorbing layers. As is apparent from such a technique, as the roll is being unwound and a given layer effectively works its way toward the surface, it will receive increments of dose on passing through the beam of magnitude equal to that corresponding to its layer position in the penetration range. Therefore, by the time the last layer reaches the surface, it will have received an accumulated or integrated dose. This accumulated dose will be directly proportional to the linear speed at which the material is being unwound, other irradiating conditions such as beam current, voltage and position of the roll within the radiation field, being held constant. It should be noted that if the tape or sheets are to be removed from the roll at a non-linear velocity, it would be necessary to vary the irradiation conditions in a manner that would compensate for the unequal time that different parts of the tape remained in the irradiation field. Note should also be taken that in order to insure uniform irradiation, the distance of the surface being irradiated from the window of the cathode ray generator must be maintained constant. Provision should therefore preferably be made for raising the roll to a suitable height to maintain a constant distance from the window of the cathode ray generator while the tape or sheet is being passed under the window and being removed from one roll and wound up on the wind-up roll. Another alternative comprises maintaining the winding or unwinding roll in a stationary position but compensating for the changing distance of the uppermost ply in the roll from the beam source by increasing or decreasing the speed of wind-up or unwind.

Figure 2:
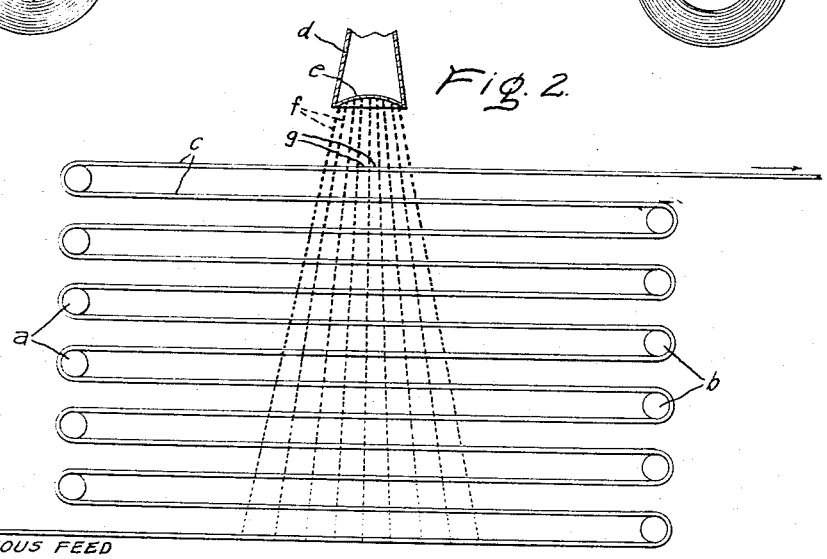

Another method for irradiating plies of polyethylene is to thread the tape or sheet material back and forth through the beam so that the total number of layers directly under the beam will always be essentially equivalent (for optimum results) to the total penetrating thickness of the beam. If desired, fewer layers may be employed than are necessary to absorb essentially all the radiation striking the said layers; however, this will result in a decreased efficiency, although this will be an improvement over the irradiation of single layers. By the time a given section of material finally leaves the irradiation zone, it will have an accumulated dose equal to the sum of all the increments that it has received at each ply depth. To accomplish this, the tape is advantageously passed over a series of rolls at each end of the irradiation field. It is usually desirable, although not necessary, to guide individual layers so that they are as close together as possible on passing through the irradiation zone to eliminate loss in the air path between the layers. FIG. 2, which illustrates an embodiment of this technique, is a side view showing plies $c$ of polyethylene being continuously fed over rollers $a$ and $b$ so that a given section of film successively works its way up to the top where the uppermost surface $g$ is closest to the source of electrons $f$ issuing from the exit window $e$ of the cathode ray generator tube $d$, and is thereafter continuously taken off. The film makes a sufficient number of passes between the rolls so that essentially none of the beam penetrates through the bottom ply, although fewer plies could be used so that commercially insignificant loss of electrons could be tolerated. As in other embodiments to be shown, in which a film is being passed continuously under the high energy electrons, each section of the film makes a pass under the beam at each ply depth and the inefficiency due to penetration is substantially eleminated. If desired, additional rollers could be installed in the middle of each ply to bring each ply up against the one above it and thus prevent losses in the air spaces between the plies.

FIG. 3, which again is a cross-sectional view shows another embodiment of my invention. In this figure a plurality of layers of polyethylene sheet material or tape of which layers $c$, $k$, and $j$ are representative, are passed in close proximity with each other around a roll $a$ revolving in the direction of the arrow and thereafter are subject to more intense radiation by the high energy electrons $f$ issuing from the exit window $e$ of the cathode ray tube $d$, the immediate surface $g$ of the upper ply being closest to the source of radiation. It will be apparent that in such an embodiment, the section $k$ when it acts as the lowest layer will receive a very low dose in its first pass under the electron beam. As it passes around the roll and comes again into the range of the beam pattern now designated as section $k'$, it will receive a very high dose at that point so that the total dose which the $k$, $k'$ section will accumulate will be the desired dosage. Section $c$, for example, will receive a higher dosage than section $k$ on their first passes, and as section $c'$ will receive less dosage than $k'$ on the second passes through the beam; and the total dosage accumulated by section $c$, $c'$ will be nearly the same as that accumulated by $k$, $k'$. The same applies to all other sections such as section $j$, $j'$.

This method has a particular advantage when very thick films are to be processed or when very low lineal film speeds are desired. Because of the fact that each section of the film is passed under the beam only twice, but under such conditions that the further the section is from the source of radiation in the first pass, the nearer it is to the source of variation on the second pass, more efficient utilization of the beam can be obtained. The thickness of the total number of plies in the band should be such that the inside ply which is in contact with the roll is subjected in its first pass approximately half the intensity of irradiation ply to which the ply nearest the source of radiation is being subjected. For an 800 kilovolt peak cathode ray beam (other beam intensities may be used), a bank thickness of 75 mils is close to the optimum. One can readily calculate the relative total cumulative exposure at various ply depths within such a band.

Figure 3:
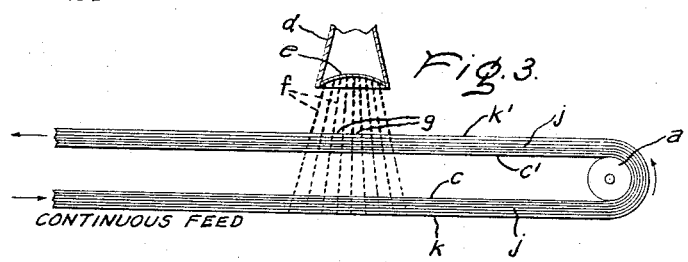
Figure 4:
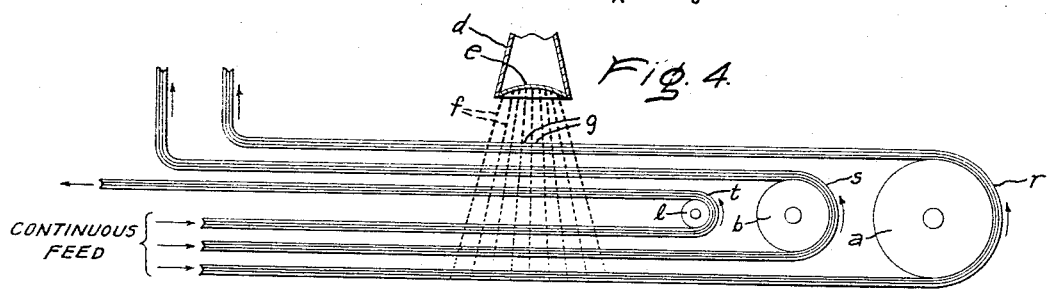

The embodiment described in FIG. 3 can be further modified and the over-all uniformity and efficiency of irradiation can in some cases be given a small further increase by subdividing the total band of plies into several sub-bands each traveling at a slightly different speed. FIG. 4 shows this particular embodiment whereby the total band of polyethylene is subdivided into several sub-bands so that each travels at a slightly different speed. By regulating the speed of the bands and by regulating the number of plies in each band, it is possible to obtain somewhat more uniform irradiation of all the plies regardless of the position in which they may have been with regard to their exposure to the high energy electrons or their position in the setup of the various bands. In FIG. 4, which is a side view, bands, $r$, $s$, $t$ of polyethylene composed for illustrative purposes of three layers of polyethylene in sheet or tape form are moved around rolls $a$, $b$ and $l$ whereby the rolls are revolving counterclockwise. The rolls revolve at somewhat different speeds so as to give substantially uniform irradiation of all the plies in the various bands of polyethylene as they pass by the beam pattern $g$ of electrons issuing from the exit window $e$ of the cathode generator tube $d$.

When employing the band method, that is, using bands of multiple plies of polyethylene in the irradiation processing, it is possible to calculate with great accuracy the band speed required for a given average irradiation dosage level using total band thickness as the thickness of the feed ply. Thus, employing an 800 kilovolt peak cathode ray beam, it has been shown that for material passing directly through the beam center line at a distance of 20 centimeters below the tube window, an average dose of $7.5 \times 10^6$ Roentgens would be obtained at a lineal speed for a 75 mil band of 1.0 ft. per minute. Calculations of this type require recourse to Table I. Correspondingly, it is possible to determine the lineal speed for all types and thicknesses of these polyethylene bands taking into consideration the average dosage desired to be introduced into the polyethylene plies.

Although FIGS. 3 and 4 are concerned with bands of a plurality of plies in which each ply is in the form of a flat sheet or tape, it will be apparent to those skilled in the art that the band could be composed of other types of plies. Thus, the band could be formed of multiple plies of folded film, lay-flat tubing, or folded lay-flat tubing in order to permit opening the film after irradiation to a width two or more times the effective width of the cathode ray beam pattern. In connection with the latter observation as to the effective width of the cathode ray beam pattern, for optimum utilization of the beam where most advantageous techniques are not used for insuring absolutely equal irradiation of the whole width or tape or sheet, it may be advantageous to allow the beam pattern to overlap the width of the tape or sheet so that a portion of the beam which is of reasonably strong intensity falls on the maximum width of the tape or sheet and the lowest intensity area on the sides of the beam fall outside the width of the tape or sheet. This will be more clearly amplified in the discussion of the invention with respect to efficient utilization of the beam pattern.

Another embodiment of our invention described in FIG. 5 would be carried out with an electron beam which irradiates a band (in the form of a closed loop) of many plies of tape or sheet material or similar flat stock in which the number of plies (for instance, from 10 to 100, depending on thickness) is such that loss of radiation through the bottom ply is preferably negligible. The film is fed to the inside of the loop and works its way one ply nearer the outside each time around the two end rolls. When using this embodiment, it is possible to effect continuous irradiation with no down time or end-of-roll exposure differences; in addition, the top surface has no curvature and inherently remains a constant distance from the beam window. Thus, according to FIG. 5, polyethylene tape is fed into the system and turned on a horizontal turning bar $q$ so that the tape enters under revolving roll $a$. As the tape moves from roll $a$ to roll $b$, it is allowed to form, for illustration purposes, a six-ply thickness, the lower plies being identified as $c$ and the upper plies being identified as $c'$. As the tape continues to move in its path, the portion shown in FIG. 5 will be subjected to irradiation 11 times, namely, five times when it is in the lower section and six times when it is in the upper section. Thus, each ply will be within the beam pattern 11 different times but being subjected to different doses each time as it works up to the outer surface $g$, which is nearest the radiation source, before being taken off to a winding roll. Obviously, the number of plies and the number of times that it would pass through the beam of high energy electrons can be varied, depending upon such factors as the intensity of the beam, the type of organic polymer used, the thickness of the tape or sheet, and the desired cumulative dosage. The irradiation apparatus is so adjusted that the electrons penetrate all plies within its penetrating capacity at the same time, with the lowest ply being properly positioned so that there is preferably no loss of radiation by virtue of further penetration through the lowest ply, which, if desired, could be restricted to upper plies $c'$.

It will, of course, be apparent to those skilled in the art that other embodiments of high energy irradiation of organic polymers are intended to be included within the scope of the above-described techniques illustrated by the accompanying figures whereby more efficient utilization of the high energy radiation is obtained.

In addition to obtaining efficient utilization of the high energy irradiation through the polymeric flat stock material by means of the multi-ply treatment described above, one can combine with this treatment means for efficiently utilizing the high energy radiation so that uniformity of radiation is obtained across the width and length of the polymeric flat stock being irradiated. Since much of the presently available commercial equipment for generating high energy radiation, such as high energy electrons, yields a radiation zone in the form of a circular beam (for instance, from a cathode ray generator or from other electron accelerating apparatus as described previously), it is evident that in such a circular beam the center of the beam will be of the greatest intensity, while as one travels radially to the outer periphery of the beam, the intensity will decrease so that at the outer edge the intensity is least. Thus, if one irradiates, for instance, polyethylene film, it will be evident that the center of the polyethylene film will be receiving a much higher radiation dose while the outer edge of the polyethylene film will be receiving the minimum acceptable dose of electrons.

A means for equalizing the dose of radiation accumulated in the width and length of the polymeric film is more particularly described in the copending application of Frederic W. Hammesfahr and Robert A. Hatch, Ser. No. 481,151 (now Patent 2,914,450), filed concurrently herewith and assigned to the assignee of the present invention. According to this invention, plies of the organic film are allowed to travel through the electron beam in such a manner that in the initial series of passes the right edge of the film passes through the center of the circular beam pattern while in the second series of passes the left edge of the film passes through the center of the circular beam pattern. More particular directions for obtaining this uniformity of dose accumulation in the flat stock polymeric material being subjected to irradiation are found in the above described Hammesfahr and Hatch application. This method can be combined with my multi-ply treatment for utilizing efficiently the penetrating characteristics of the high energy irradiation, for instance, high energy electrons.

A still further method which has been devised to insure more uniform utilization of an electron beam comprises interposing a shield or mask of special configuration between the beam and the polyethylene ply or plies being irradiated. As pointed out previously, the greatest intensity of radiation is found in the absolute center of the electron beam and as one proceeds to the periphery of the beam, the intensity decreases until at the outer edge of the beam the intensity of the radiation is lowest. It is therefore evident that if one were to pass plies of polyethylene in such a manner that the center of the beam would be in the center of the ply of polyethylene, a greater dose would be accumulated in the center portion of the polyethylene film while a lower dose of irradiation will be accumulated on the outer edge. Obviously, such unequal distribution of dosage is undesirable in most applications because uniformity of properties is highly essential if one is to be able to rely upon the properties of the irradiated polyethylene no matter what portion of the polyethylene a person may work with.

This unequal distribution of energy impinging on the surface of the polyethylene can be readily avoided, by inserting a masking device between the electrons and the surface or surfaces being irradiated whereby the time during which the center portion of the electron beam irradiates the center portion of the polyethylene ply or plies passing underneath thereof is much less than the time during which the outer sides of the polyethylene strip are being irradiated with the lower intensity peripheral portions of the electron beam. A masking device suitable for this purpose is preferably one made of a material such as, for instance, a metal (e.g., aluminum, stainless steel, iron, lead, etc.), through which the electrons will not penetrate. FIG. 6 of the attached drawing is a plan view of such a shield or mask designed to permit uniform radiation of polyethylene, or any suitable organic polymer for that matter, whereby the mask reduces the time of exposure to the electron beam of the center portion of the polyethylene strip as it passes underneath the electron beam and permits a longer time interval of exposure of the outside portions of the polyethylene traveling beneath the less intense portion of the beam. More particularly, FIG. 6 shows a ply $c$ of polyethylene (under which may obviously be placed a plurality of other plies of polyethylene in the manner described in the earlier figures), the said polyethylene traveling in the direction of the arrows at a uniform rate. The electron beam pattern is identified by the dashed portions of which the center $n$ is the most intense portion of the beam, the portion $o$ is intermediate in intensity between the center and the outer periphery while the outer edge $p$ of the electron beam is of the lowest intensity. Two shields $h$ and $m$ are interposed between the electron beam and the polyethylene in such a manner that the nose portions $u$ and $v$ of the two shields are closest together at the center of the beam and at the center of the area of impingement of the electron beam on the polyethylene. The nose portions of the shield begin to taper off into gradually larger exposure areas by means of tapered sides $w$ of both shields in a manner whereby larger portions of the polyethylene will be exposed to the electron beam, and thus such portions of the polyethylene will be in the area of the electron beam whose intensity is lower for a longer period of time than in the center portion of the beam which is allowed to impinge on the polyethylene center portion by virtue of the presence of the nose portions $u$ and $v$ for a much shorter period of time.

As will be apparent to those skilled in the art, the configuration of the shielding device shown in FIG. 6 will vary within wide conditions and such variations and configurations can be readily calculated with little difficulty. Thus, the configuration of the shielding device shown in FIG. 6 may depend upon such factors as the speed with which the polyethylene will be traveling, the size and intensity of the electron beam, the thickness of the polyethylene or the number of plies underneath the top ply of the polyethylene, etc. Obviously, modifications of FIG. 6 may be made without departing from the scope of the invention. Thus, instead of one electron beam, there may be two electron beams placed over the surface of the polyethylene traveling underneath the beams. This will, of course, require modification of the mask to take into account the fact that there will be two intense portions of the beam impinging on the polyethylene surface. Also, it is possible when irradiating tapes whose width is much less than the width of the beam, to alter the shield or masking device so that the least intense portions of the beam will actually be outside the edges of the tape passing underneath the beam. Although this shielding device operates at a lower level of efficiency than the other methods described for obtaining uniformity of irradiation, nevertheless, it does provide a simple method for obtaining uniformity when high efficiency of beam utilization is not required.

Another method for more efficient utilization of the electron beam whereby uniform irradiation is obtained over the entire width of the polyethylene ply or plies passing underneath the beam, is accomplished by passing the film of polyethylene through an electron beam having a pattern such that points moving in a plane in parallel lines at the same lineal velocity will all receive essentially the same cumulative exposure in passing completely through the beam regardless of the position of the line of motion across the width of the beam. With such a beam, all material passing through it at any given ply or material depth will receive the same exposure as all other material at the same depth and moving at the same speed, without any necessity for a mechanical manipulation or other similar process techniques. This not only simplifies materials' handling equipment required, but also results in more uniform and hence more efficient irradiation across the width of the material being irradiated. Generally, in order to obtain maximum over-all efficiency when utilizing the beam having such characteristics, the width of the material being irradiated should be the same as the width of the beam pattern, the depth should be sufficient to completely absorb the beam, and suitable process methods such as those described previously should be employed to eliminate inefficiency resulting from the penetrating characteristics of the beam. More particularly, this might be accomplished by sweeping the beam, preferably electronically, at high frequency over a considerable length producing in effect a long, narrow rectangle or, if desired, a square of irradiated area. The length should be sufficient that the edge losses at each end are negligible. Thus, it is possible to sweep a small circular electron beam from one side of the sheet material being irradiated to the other side at such a rate that the center of the beam moves across the face of the polyethylene in as short a period of time as possible with the maximum possible frequency.

The rate of speed of passage of the polyethylene in the above technique is adjusted and calculated to give the desired irradiation dose as the polyethylene moves through the beam. Consideration should also be given to the fact that the beam in its travels back and forth across the width of the polyethylene or in some other geometric configuration traveling across the width of the polyethylene ply may, with some accelerators, vary in intensity so that it may be necessary to accelerate or decelerate the rate of travel of the electron beam over certain portions of the polyethylene surface being irradiated.

Alternatively, modification or change in position of the axis of an electron beam upon issuance from the window of the accelerating apparatus may be accomplished by the action of alternating current electromagnets which permit oscillation at extreme speed of the beam over the surface of the polyethylene being irradiated. Another modification (as shown in U.S. Patent 2,602,751) comprises an accelerating apparatus (such as a Van de Graaff acceleration tube) having connected to it by flanges or otherwise a widely flaring or flared lower end to provide space wherein the scanning action of a field occurs through the action of a pair of alternating current electromagnets, before the electron beam issues through the window. This greatly elongates the electron beam pattern in one direction.

It will, of course, be understood by those skilled in the art that other embodiments of the above described invention whereby efficient utilization of an electron beam or any sort of high energy radiation suitable for the purpose is made by virtue of the use of a plurality of plies of the polyethylene described above. All other embodiments of the invention suggested by the above description are intended to be included within the scope of the present claims.

In addition to the use of polyethylene referred to in the discussion of the various figures attached to the accompanying drawing, it will also be apparent that other organic polymers, many examples of which have been given before, may be used in place of the polyethylene with equivalent results and advantages in terms of efficiency of beam utilization.

My invention covers the improvements directed toward more efficient utilization of the source of high energy radiation with respect to the penetration characteristics, emanating from whatever source of high energy radiation employing, for instance, an accelerating apparatus capable of delivering high energy electrons, radioactive sources, such as cobalt 60, X-rays suitably designed to give the necessary high energy for beneficial mutation of organic polymers, etc. By the utilization of the multi-ply treatment, especially when combined with the various forms of more efficient utilization of the high energy electrons as far as its passage over the plies, aside from its penetrating characteristics, it is possible to obtain large cost reductions in the treatment of various organic polymers and to obtain more efficient utilization and more uniform products than has heretofore been possible.

The polyethylene irradiated in accordance with my invention can be used in various applications where good resistance to temperature and solvents, as well as freedom from stress cracking in the presence of chemicals, are desirable features of the polyethylene. Thus, the irradiated polyethylene can be used to insulate conductors. Insulating tapes, as well as sheet material, prepared from the irradiated polyethylene are useful in the electrical industry and for packaging purposes.

It will be readily realized that other forms of electron accelerating apparatus may be employed instead of the high voltage apparatus referred to previously. For example, linear accelerators of the type described by J. C. Slater in Reviews of Modern Physics, Volume 20, No. 3, pages 473–518 (July 1948) may be utilized. In general, the energy of the electrons employed in the practice of the invention may range from about 50,000 electron volts to 10,0000,000 electron volts or higher, depending upon the depth to which it is desired to affect the organic polymers. One may employ, if desired, a reflecting barrier underneath the last ply of organic polymer to reflect back to the organic polymer a portion of any high energy radiations which may perchance penetrate through the last ply being irradiated. Preferably, enough plies should be employed so that there is no need for such a barrier.

Obviously, various modifying agents, such as dyes, pigments, stabilizers, etc. may be added to the organic polymers herein described prior to irradiation without departing from the scope of the invention.

What I claim as new and desire to secure by Letters Patent of the United States is:

1. Apparatus for increasing uniformity of dose produced by electron irradiation in a product which is divisible into thin layers, comprising in combination: means for creating a stream of high energy electrons and means for conducting such a product through said stream in such a manner that, during the irradiation of any point in such product, the normalized product thickness intervening between such point and the electron source assumes a sequence of values, which sequence is substantially the same for all points in the product.

2. Apparatus for irradiating, with a stream of high energy electrons, material which is capable of division into incremental layers sufficiently thin so that the variation in dose across each such layer produced by a stream of electrons traveling transversely to such layer is negligible, comprising in combination: means for creating and directing a stream of high energy electrons; and means for conducting said material through said stream in such a manner that at any instant said stream travels through a sequence of incremental layers the total combined thickness of which is not less than on the order of the maximum penetration of said electron stream, the motion of said material being such that every part of said material assumes in succession substantially all positions in said sequence.

3. Apparatus for electron irradiation of continuous lengths of flexible sheet material comprising in combination: means for creating and directing a stream of high energy electrons; means for rotatably supporting at least one roll of flexible sheet material in the path of said stream so that the axis of said roll lies transversely to the direction of travel of the electrons in said stream; and means for winding or unwinding said flexible sheet material onto or from said roll during the irradiation process, whereby, during the irradiation of any point in such product, the normalized product thickness intervening between such point and the electron source assumes a sequence of values, which sequence is substantially the same for all points in the product.

4. The process for irradiating polyethylene with high energy electrons from a high voltage accelerating apparatus in order to utilize more efficiently the aforesaid radiation, which process comprises winding a polyethylene film onto a roll and irradiating the winding roll with said high energy electrons, the thickness of said film of polyethylene being substantially less than the penetration depth of said electrons, there being present a sufficient number of superposed layers of the polyethylene film during the winding of the roll so that there is a layer sufficiently removed in distance from the source of high energy electrons at the time it is passing through the electron beam which absorbs substantially all the electrons penetrating through the layers in the winding roll immediately above it, whereby each portion of said polyethylene passes through said electron beam a plurality of times at a series of different distances from the source of high energy electrons and where each portion of said polyethylene receives substantially the same total electron dose during its plurality of passes through said electron beam.

5. The process for irradiating polyethylene with high energy electrons from a high voltage accelerating apparatus in order to utilize more efficiently the aforesaid radiation, which process comprises irradiating a plurality of superposed plies of polyethylene with said high energy electrons while passing said plurality of superposed plies of polyethylene through a high energy electron beam, the thickness of each of said plies being less than the penetration depth of said electrons, and thereafter repassing the superposed plies through the beam of electrons at a distance from the source of electrons which is different from the distance at which any one ply was from the source of electrons in its previous passage through the beam of electrons, each ply in its various passages through the electron beam assuming a sequence of positions, the sequence of positions for each of said plies being substantially the same, whereby each of said plies receives substantially the same total irradiation dosage.

6. The process for irradiating a plurality of bands of polyethylene with high energy electrons from a high voltage accelerating apparatus in order to utilize more efficiently the aforesaid radiation, which process comprises irradiating a plurality of bands of polyethylene with said high energy electrons while continuously and simultaneously passing first and second sections of each of the aforesaid bands through a beam of high energy electrons, the said bands being composed of a plurality of plies of flat stock polyethylene, the thickness of each ply being substantially less than the penetration depth of said electrons and the total thickness of said superposed sections being substantially equal to the penetration depth of said electrons, the first and second section of each of said bands being passed through said beam in such a manner that the positions of said sections are reversed with respect to each other during the two passes of each of said sections through said beam of high energy electrons, and with the velocities of each of said bands being adjusted to compensate for the difference in the energy of said electrons as they pass through such band, whereby each band of polyethylene receives substantially the same total dose of electrons.

7. The process for irradiating flat stock polyethylene with high energy electrons from a high voltage accelerating apparatus in order to utilize more efficiently the aforesaid radiation and to accumulate essentially the same dose of irradiation across the width of the moving polyethylene flat stock, which process comprises irradiating a plurality of superposed layers of polyethylene flat stock with said high energy electrons while passing a plurality of superposed layers of polyethylene flat stock simultaneously through a beam of high energy electrons, the thickness of each of said layers being substantially less than the penetration depth of said electrons, with the thickness of said superposed layers being such that essentially no electron irradiation penetrates the bottom layer, said electrons in said beam being distributed so that the irradiation dose rate in the center of said moving polyethylene flat stock tends to be greater than the dose rate at the outer portions of said stock, masking the area of the polyethylene surface being subjected to electron bombardment so that simultaneously the center portion of the polyethylene flat stock in its passage through the electron beam is under electron bombardment for shorter period of time than the outer portions of the same section of the polyethylene flat stock, whereby the dose rate in the center of said polyethylene flat stock is substantially equal to the dose rate at the outer portions of said stock.

8. The process for irradiating polyethylene with high energy electrons from a high voltage accelerating apparatus in order to utilize more efficiently the aforesaid radiation, which process comprises irradiating a plurality of superposed plies of polyethylene with said high energy electrons while passing said plurality of superposed plies of polyethylene through a high energy electron beam, the thickness of each of said plies being less than the penetration depth of said electron beam and the width of said beam being less than the width of said plies, and thereafter repassing the superposed plies through the beam of electrons at a distance from the source of high energy electrons which is different from the distance at which any one ply was from the source of electrons in its previous passage through the beam of electrons, each ply in its various passages through the electron beam assuming a sequence of positions, the sequence of positions for each of said plies being substantially the same, whereby each of said plies receives substantially the same total irradiation dosage, and scanning said beam across the width of said plies in such a manner that all points of said polyethylene moving in a plane in parallel lines at the same lineal velocity will receive essentially the same electron dosage.

9. The process for irradiating flat stock polyethylene with high energy electrons from a high voltage accelerating apparatus in order to utilize more efficiently the aforesaid radiation, which process comprises irradiating a section of flat stock polyethylene within a multiple ply build-up with said electrons while passing through a beam of said electrons a section of flat stock polyethylene within a multiple ply build-up, where the thickness of said flat stock polyethylene is less than the penetration depth of said electrons and where the multiple ply build-up is greater than the penetration depth of said electrons, and thereafter repassing the same section of polyethylene flat stock at least one additional time through said beam of high energy electrons at different ply depths and at different distances from the source of high energy electrons during its passage through the beam so that each section of the polyethylene flat stock is subjected to at least two different doses of radiation, with the different ply depths and different distances being selected so that each section of said flat stock receives substantially the same total electron dosage.

10. The process for irradiating polyethylene with high energy electrons from a high voltage accelerating apparatus in order to utilize more efficiently the aforesaid radiation, which process comprises unwinding a roll of polyethylene film and irradiating the unwinding roll with said high energy electrons, the thickness of said film of polyethylene being substantially less than the penetration depth of said electrons, there being present a sufficient number of superposed layers of polyethylene film during the unwinding of the roll so that there is a layer sufficiently removed in distance from the source of high energy electrons at the time it is passing through the electron beam which absorbs substantially all the electrons penetrating through the layers in the unwinding roll immediately above it, whereby each portion of said polyethylene passes through said electron beam a plurality of times at a series of different distances from said source of high energy electrons and where each portion of said polyethylene receives substantially the same total electron dosage during its plurality of passes through said electron beam.

11. The process for continuously irradiating with high energy electrons from a high voltage accelerating apparatus, layers of an organic polymer selected from the class consisting of polyethylene, chlorinated polyethylene, chlorosulfonated polyethylene, superpolyamide resins, natural rubber, copolymers of butadiene and styrene, copolymers of butadiene and acrylonitrile, organopolysiloxanes convertible to the cured, solid, elastic state, polyacrylonitrile, and polyethylene terephthalate, said layers having a thickness substantially less than the penetration depth of said electrons, which process comprises irradiating a plurality of layers of said organic polymer with said high energy electrons while passing a plurality of layers of said polymer simultaneously through a beam of high energy electrons having an energy of at least 50,000 electron volts, the combined thickness of said plurality of layers being substantially greater than the penetration depth of said electrons, and then repassing the plurality of layers through the beam of electrons a plurality of different times with the position of each layer of said polymer with respect to said plurality of layers assuming a sequence of values during successive passes through said beam of electrons and with substantially every one of said layers assuming the same sequence of values, whereby each layer receives substantially the same total irradiation dosage.

12. The process for continuously irradiating with high energy electrons from a high voltage accelerating apparatus layers of polyethylene, which layers have a thickness substantially less than the penetration depth of said electrons, which process comprises irradiating a plurality of said layers of said polyethylene with said high energy electrons while passing a plurality of layers of said polyethylene simultaneously through a beam of high energy electrons having an energy of at least 50,000 electron volts, the combined thickness of said plurality of layers being substantially greater than the penetration depth of said electrons, and then repassing the plurality of layers through the beam of electrons a plurality of times with the position of each layer of polyethylene with respect to the plurality of layers assuming a sequence of values during successive passes through said beam of electrons and with substantially every one of said layers assuming the same sequence of values, whereby each layer receives substantially the same total electron dosage.

13. The process for continuously irradiating with high energy electrons from a high voltage accelerating apparatus layers of an organopolysiloxane convertible to the cured, solid, elastic state, which layers have a thickness substantially less than the penetration depth of said electrons, which process comprises irradiating a plurality of layers of said organopolysiloxane with said high energy electrons while passing a plurality of layers of said organopolysiloxane sumultaneously through a beam of high energy electrons having an energy of at least 50,000 electron volts, the combined thickness of said plurality of layers being substantially greater than the penetration depth of said electrons, and then repassing the plurality of layers through the beam of electrons a plurality of times with the position of each layer of said organopolysiloxane with respect to said plurality of layers assuming a sequence of values during successive passes through said beam of electrons and with substantially every one of said layers assuming the same sequence of values, whereby each layer receives substantially the same total electron dosage.

14. The process for continuously irradiating with high energy electrons from a high voltage accelerating apparatus layers of a superpolyamide resin, in which said layers have a thickness substantially less than the penetration depth of said electrons, which process comprises irradiating a plurality of layers of said superpolyamide resin with said high energy electrons while passing a plurality of layers of the superpolyamide resin simultaneously through a beam of high energy electrons having an energy of at least 50,000 electron volts, the combined thickness of said plurality of layers being substantially greater than the penetration depth of said electrons, and then repassing the plurality of layers through the beam of electrons a plurality of times with the position of each layer of each superpolyamide resin with respect to said plurality of layers assuming a sequence of values during successive passes through said beam of electrons and with substantially every one of said layers assuming the same sequence of values, whereby each layer receives substantially the same total electron dosage.

15. The process for continuously irradiating with high energy electrons from a high voltage accelerating apparatus layers of chlorinated polyethylene, which layers have a thickness substantially less than the penetration depth of said electrons, which process comprises irradiating a plurality of layers of said chlorinated polyethylene with said high energy electrons while passing a plurality of layers of the polymer simultaneously through a beam of high energy electrons having an energy of at least 50,000 electron volts, the combined thickness of said plurality of layers being substantially greater than the penetration depth of said electrons, and then repassing the plurality of layers through the beam of electrons a plurality of times with the position of each layer of said chlorinated polyethylene with respect to said plurality of layers assuming a sequence of values during successive passes through said beam of electrons and with substantially every one of such layers assuming the same sequence of values, whereby each layer receives substantially the same total electron dosage.

16. The process for continuously irradiating with high energy electrons from a high voltage accelerating apparatus layers of chlorosulfonated polyethylene, which layers have a thickness substantially less than the penetration depth of said electrons, which process comprises irradiating a plurality of layers of said chlorosulfonated polyethylene with said high energy electrons while passing a plurality of layers of said chlorosulfonated polyethylene simultaneously through a beam of high energy electrons having an energy of at least 50,000 electron volts, the combined thickness of said plurality of layers being substantially greater than the penetration depth of said electrons, and then repassing the plurality of layers through the beam of electrons a plurality of times with the position of each layer of said chlorosulfonated polyethylene with respect to said plurality of layers assuming a sequence of values during successive passes through said beam of electrons and with substantially every one of such layers assuming the same sequence of values, whereby each layer receives substantially the same total electron dosage.

17. The process of improving the properties of an organic polymer and more efficiently utilizing the radiation from a high energy electron source which comprises irradiating a plurality of superposed distinct layers of said polymer with high energy electrons while passing a plurality of superposed distinct layers of said polymer transversely through a beam of electrons having an energy of at least 50,000 electron volts, the thickness of said distinct layers being less than the thickness of said polymer through which said electrons will pass, whereby said electrons pass through more than one of said layers, and repassing said polymer layers through said electron beam with said layers at different successive distances from the source of electrons, whereby each of said layers receive substantially the same total irradiation dose.

(References on following page)

References Cited

UNITED STATES PATENTS

| | | | |
|---|---|---|---|
| 2,602,751 | 7/1952 | Robinson | 204—154 X |
| 2,858,442 | 10/1958 | Dewey | 204—154 |

OTHER REFERENCES

Charlesby I "Proc. Royal Soc. London" vol. 215, pp. 187–212 (Nov.–Dec. 1952).

Charlesby II "Nucleonics" vol. 12, pp. 18–25 (June 1954).

"Chem. and Eng. News" page 3964 Oct. 4, 1954.

Ellis "Synthetic Resins" vol. 1, pp. 164–167 (1935).

RALPH G. NILSON, *Primary Examiner.*

WILLIAM J. WILES, J. R. SPECK, *Examiners.*

C. D. QUARFORTH, M. TILLMAN, R. H. ROBINSON, V. LAFRANCHI, W. F. LINDQUIST,
*Assistant Examiners.*